(No Model.)

W. C. EDGE.
CHAIN.

No. 401,935.   Patented Apr. 23, 1889.

WITNESSES:
Gustave Dieterich
Theo. F. Bourne

INVENTOR
Wm. C. Edge
BY Briesen, Steele & Knauth
ATTORNEYS.

UNITED STATES PATENT OFFICE.

WILLIAM CHARLES EDGE, OF NEWARK, NEW JERSEY.

CHAIN.

SPECIFICATION forming part of Letters Patent No. 401,935, dated April 23, 1889.

Application filed January 17, 1889. Serial No. 296,652. (No model.)

*To all whom it may concern:*

Be it known that I, WILLIAM CHARLES EDGE, of Newark, Essex county, New Jersey, have invented certain new and useful Improvements in Chains, of which the following is a specification, reference being had to the accompanying drawings, forming part hereof, in which—

Figure 1:
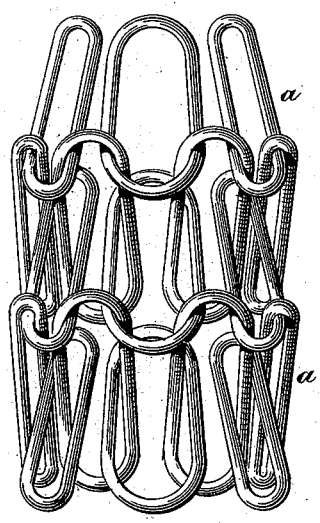
Figure 3:
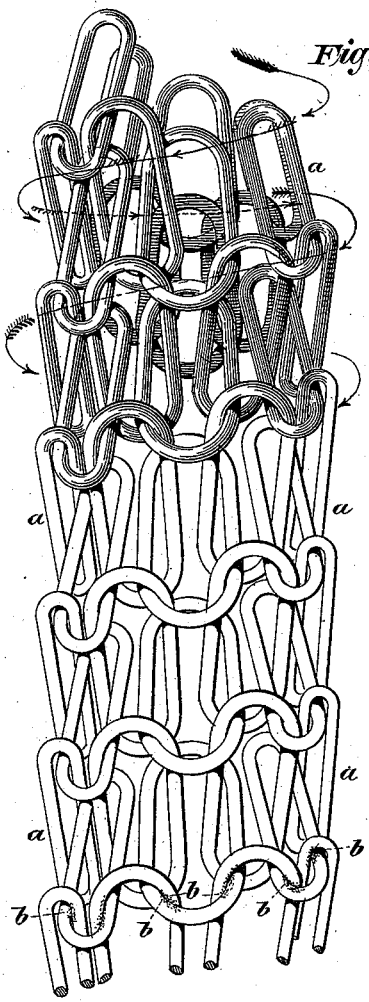
Figure 2:
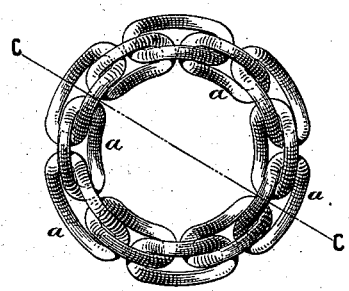
Figure 4:
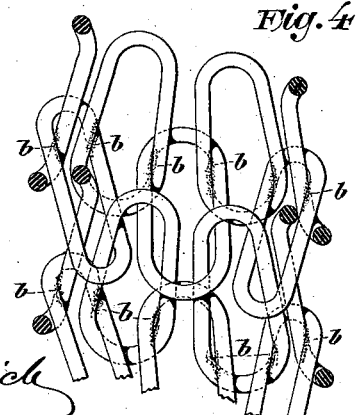

Figure 1 represents a side view of a chain of well-known construction, and which is not of my invention. Fig. 2 is a top view of my improved chain. Fig. 3 is a side view of the same; and Fig. 4 is a sectional view thereof on the line $c\ c$, Fig. 2.

This invention has for its object to produce an elastic chain—that is to say, one capable of elongation and spontaneous contraction. Chains such as are represented in Fig. 1 are well known and have long been used, and are not of my invention. They are composed of elongated links $a$, arranged in circles and interlocked with one another, the links of one circle interlocking with those of the next adjoining circles throughout the length of the structure. Such chains, so constructed, have no elasticity—that is to say, they are flexible and can be bent in any direction; but when drawn out to the utmost length they will not contract by virtue of any elastic property.

My invention consists in arranging links of a similar character to those used in the old chains, but in spiral order, as is indicated in Fig. 3, running them continuously along, and interlocking one link with two links at each end, as is clearly represented in the drawings. The links thus interlocked are then soldered or sweated together near one end of each link, where the same passes through the two other links; but the opposite end of each link is left unsoldered and free to slide on the links with which it connects. Thus in Fig. 4 of the drawings, and at the lower end of Fig. 3, the dark shaded places marked $b$ indicate where the links are united by solder and show that each of the links in the spiral has one of its ends fastened through the interlocking links, while its other end is free to slide. By this means I obtain a tubular chain of the kind shown in end view, Fig. 2, which chain is composed entirely of elongated links that are arranged spirally, and thus from this spiral structure I obtain in the chain, an inherent elasticity, which will cause it to always assume its normally shortest length after it has been pulled into a greater length. The fact that each link is free to slide at one end, but connected at the other end, allows of elongation and shortening of the chain, and serves, also, to render the chain spiral in the manner shown and described, and for the purposes hereinabove specified.

Having now described my invention, what I claim is—

An elastic self-contracting tubular chain composed of elongated links $a\ a$, that are arranged in spiral order, each link interlocking at each end with two other links and each link being fastened to the links interlocking with it near one end, but free to slide on the links with which it interlocks near the other end, substantially as described.

WILLIAM CHARLES EDGE.

Witnesses:
HARRY M. TURK,
THEO. FRED. BOURNE.